Nov. 30, 1965   W. HAMILTON   3,220,467
HATCH COVER ACTUATING MECHANISM
Original Filed Dec. 15, 1960   3 Sheets-Sheet 1
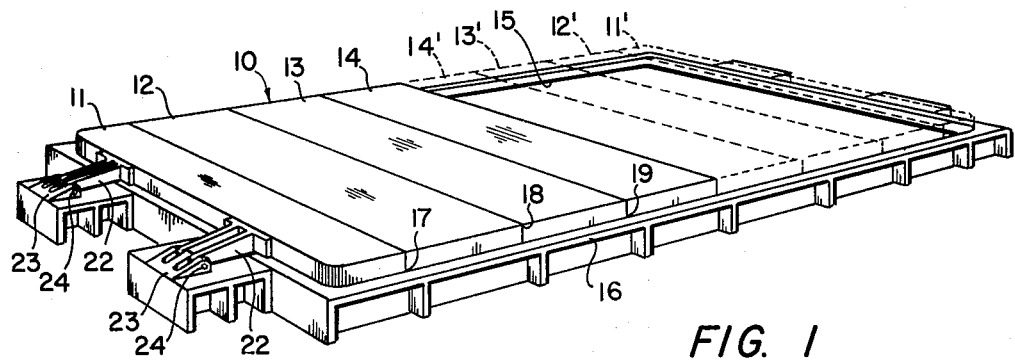
FIG. 1
FIG. 2
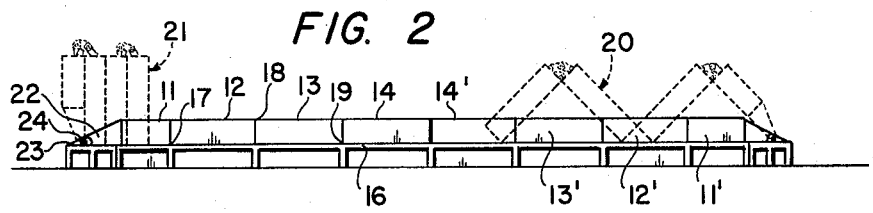
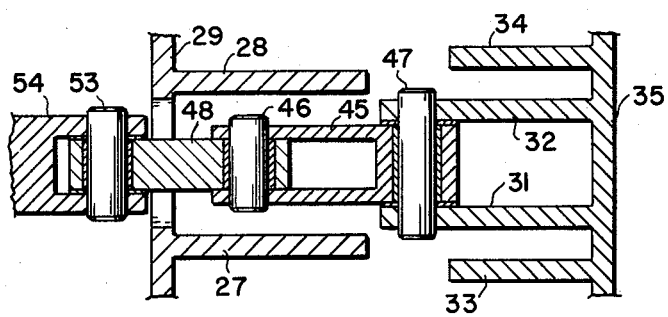
FIG. 5
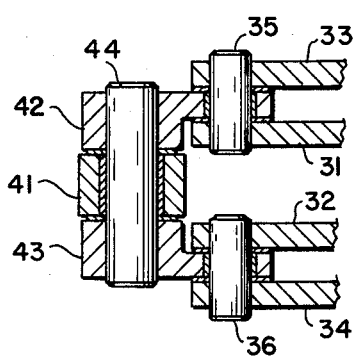
FIG. 6
INVENTOR.
WALLACE HAMILTON
BY
ATTORNEY

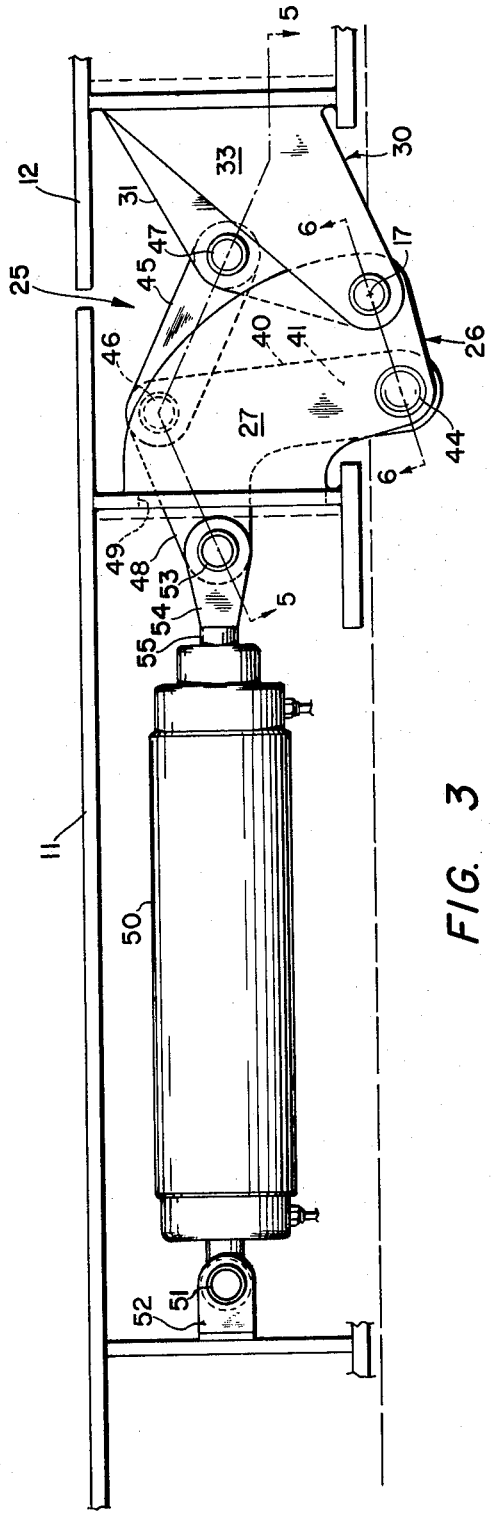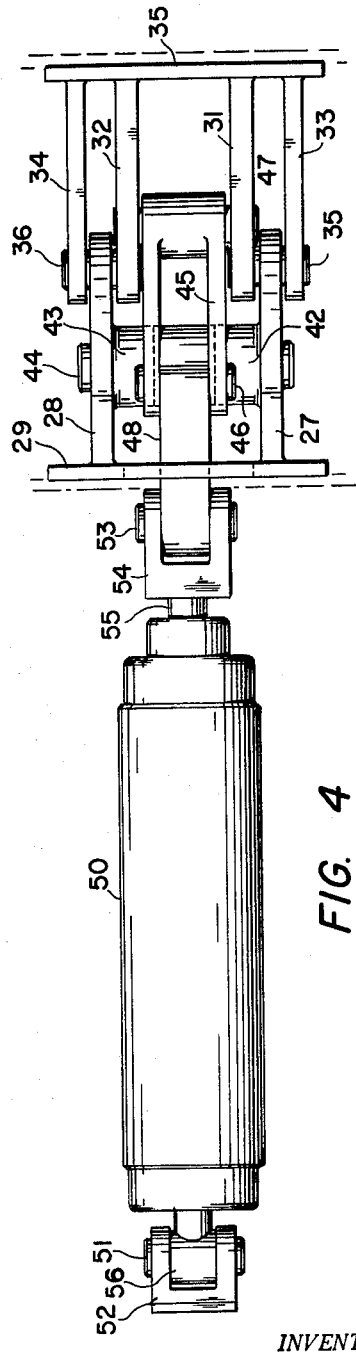

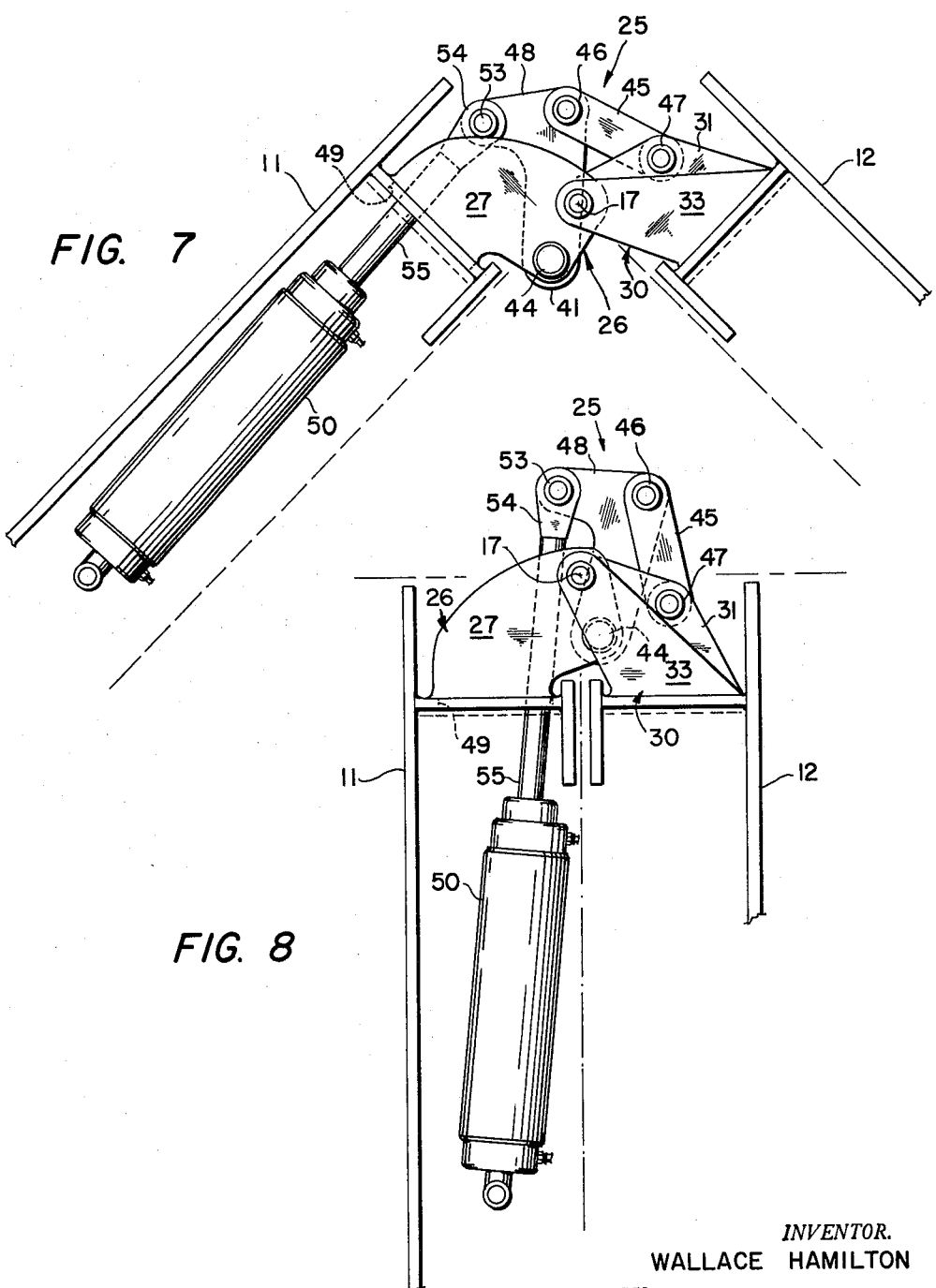

United States Patent Office 3,220,467
Patented Nov. 30, 1965

3,220,467
HATCH COVER ACTUATING MECHANISM
Wallace Hamilton, Bentleyville, Ohio, assignor to PneumoDynamics Corporation, Cleveland, Ohio, a corporation of Delaware
Continuation of application Ser. No. 75,990, Dec. 15, 1960. This application Oct. 21, 1964, Ser. No. 405,622
4 Claims. (Cl. 160—188)

This application is a continuation of my prior copending application Serial No. 75,990, filed December 15, 1960, now abandoned.

The instant invention relates to hatch covers for ships, in which the hatch covers comprise a plurality of panels, which, in closed position, are disposed adjacent to each other overlying the hatch opening to close the same. To open the hatch, the hatch cover panels are folded relatively to each other to move them to stowed positions at opposite ends of the hatch to provide clear access through the hatch opening. This invention relates more particularly to a hatch cover actuating mechanism for actuating the hatch cover panels to opened and closed positions.

It is an object of the instant invention to provide a hatch cover with an improved actuating mechanism for opening and closing the hatch cover panels.

It is another object of the instant invention to provide a hatch cover with an improved actuating mechanism for opening and closing the hatch cover panels, in which the actuating means is combined with the hinge means connecting adjacent hatch cover panels.

It is a further object of the instant invention to provide a hatch cover with an improved actuating mechanism for actuating the hatch cover panels to opened and closed positions, in which the actuating elements and hinge elements are combined in a single assembly, with the actuating elements being connected to the hinge elements and applying operating forces to adjacent hatch cover panels through the hinge elements.

It is still another object of the instant invention to provide a compact and simple actuating and hinge mechanism, which is adapted to be disposed between adjacent panels of a hatch cover for hingedly connecting said panels to each other and for providing actuating forces to move said hatch cover panels to opened and closed positions.

Further objects and advantages will appear from the following description and drawings wherein:

FIG. 1 is a perspective view of a hatch cover to which the instant invention is applicable, FIG. 2 is an elevational view of the hatch cover and shows the intermediate and stowed positions of the hatch cover panels, FIG. 3 is an elevational view of the actuating and hinge mechanism connecting adjacent hatch cover panels, FIG. 4 is a top plan view of the actuating and hinge mechanism, FIG. 5 is a partial sectional view of the actuating and hinge mechanism taken on the line 5—5 in FIG. 3, FIG. 6 is a partial sectional view of the actuating and hinge mechanism taken on the line 6—6 in FIG. 3, FIG. 7 is an elevational view of the actuating and hinge mechanism in an intermediate operated position thereof, and FIG. 8 is an elevational view of the actuating and hinge mechanism in the stowed position of the hatch cover panels.

The hatch opening provided in the deck of a ship must be covered by a suitable hatch cover which provides a weather-tight closure to protect the cargo which is stowed in the hatch. It is required that such a hatch cover be easily and quickly operable to withdraw the hatch cover from the hatch opening when it is desired to provide access to the hatch, and similarly, it is required that the hatch cover be easily and quickly operable to close the hatch opening when it is desired to seal the hatch. These requirements are met by a hatch cover 10 constructed as illustrated in FIGS. 1 and 2. The hatch cover 10 comprises four hatch cover panels 11, 12, 13, 14 which are adapted to be stowed at one end of the hatch opening 15, and a second set of hatch cover panels 11', 12', 13', 14' which are adapted to be stowed at the opposite end of the hatch opening 15, when the hatch cover 10 is opened. The two sets of hatch cover panels may be identically constructed, and are oppositely disposed with respect to the hatch opening 15 to open and close in opposite directions. In closed position, the hatch cover 10 is seated on the hatch coaming 16 with the hatch cover panels 11, 12, 13, 14 being disposed in planar alignment. Suitable seals are usually provided between the hatch cover 10 and the coaming 16, and between the adjacent hatch cover panels 11, 12, 13, 14 to form a weather-tight cover for the hatch opening 15. Although the hatch cover 10 is shown in the drawings as comprising two sets of four hatch cover panels each, it will be understood that the number of hatch cover panels provided may be varied to satisfy the requirements of the particular ship installation.

As seen in FIGS. 1 and 2, the hatch cover 10 has a substantial thickness, and in order to permit the several hatch cover panels 11, 12, 13, 14 to be operated to opened and closed positions, there is provided between adjacent hatch cover panels a hinge having an axis disposed at either the upper surface or the lower surface of the hatch cover 10, as will be described, it being understood that the description of the hatch cover panels 11, 12, 13, 14 applies equally to the hatch cover panels 11', 12', 13', 14'. Between the hatch cover panels 11, 12 there is provided a hinge having a hinge axis 17 disposed adjacent the lower surface of the hatch cover 10; between the hatch cover panels 12, 13 there is provided a hinged connection 18 disposed adjacent the upper surface of the hatch cover 10; and between the hatch cover panels 13, 14 there is provided a hinge having a hinge axis 19 disposed adjacent the lower surface of the hatch cover 10. This disposition of the hinge axes 17, 18, 19, permits the hatch cover panels 11, 12, 13, 14, to be folded relatively to each other through an intermediate position 20 to a stowed position 21, in which the several hatch cover panels 11, 12, 13, 14 are disposed in substantially parallel disposition.

The end hatch cover panel 11 has a plurality of hinge arms 22 secured thereto and hingedly connected to hinge arms 23 by hinge pins 24, the hinge arms 23 being fixedly secured to the deck of the ship, so that the folding movement of the hatch cover panels 11, 12, 13, 14 is constrained and the folding movement operates to bring them to the stowed position 21 at the one end of the hatch opening 15. During the opening movement of the hatch cover 10, the several hatch cover panels 11, 12, 13, 14 ride along the hatch coaming 16, and in order to facilitate the same, the hatch cover panels 11, 12, 13, 14 may be provided with a plurality of rollers which are guided in tracks which may be disposed along the hatch coaming 16. The rollers and tracks for the hatch cover panels 11, 12, 13, 14 are not illustrated in the drawings since they are not included within the scope of the instant invention.

Between the hatch cover panels 11, 12, and between the hatch cover panels 13, 14 there is provided an actuating structure which is combined with the hinge structure for operating the hatch cover panels from the closed position to the stowed position, and reversely from the stowed position to the closed position. The actuating structure combined with the hinge structure provides the operating connection between the hatch cover panels 11, 12 and between hatch cover panels 13, 14, the actuating elements of the actuating structure being connected to the elements of the hinge structure, to apply the required operating forces to the respective hatch cover panels through the elements of the hinge structure for opening and closing the hatch cover panels.

Referring now to FIGS. 3 to 6, there is illustrated therein in detail the combined hinge and actuating mechanism 25 which connects adjacent hatch cover panels 11, 12. It will be understood that a similar hinge and actuating mechanism 25 is provided between adjacent hatch cover panels 13, 14 for operation of the several hatch cover panels 11, 12, 13, 14 relatively to each other, as previously described. As will appear hereinafter, the operation of the combined hinge and actuating mechanism 25 is to raise the adjacent edges of the hatch cover panels 11, 12, simultaneously moving the hatch cover panels 11, 12 to their stowed position in which they are disposed in substantial parallelism. Since the hinge arms 22 on the end hatch cover panel 11 operate on hinge pins 24 that are fixed in space, actuation of the hatch cover panels 11, 12 automatically operates to move them towards the end of the hatch opening 15, where they are stowed.

The hatch cover panel 11 is provided with a hinge element 26 having a pair of spaced hinge arms 27, 28, which extend from a hinge plate 29 by which the hinge element 26 is secured to the hatch cover panel 11 in any suitable manner, as by welding. The hinge arms 27, 28 extend from the hinge plate 29 towards the hatch cover panel 12 and downwardly, with projecting portions below the lower face plane of the panel 11, and they are hingedly connected to a hinge element 30, which is secured to the hatch cover panel 12. The hinge element 30 has a pair of spaced inner hinge arms 31, 32 and a pair of spaced outer hinge arms 33, 34, which are disposed at opposite sides of the inner hinge arm 31, 32, respectively, and are spaced therefrom. The several hinge arms 31, 32, 33, 34 extend from a hinge plate 35 by which the hinge element 30 is secured to the hatch cover panel 12 in any suitable manner, as by welding, with these hinge arms projecting downwardly below the inner face plane of the panel 12. The hinge elements 26, 30 overlap each other at the center line between the adjacent hatch cover panels 11, 12. The hinge arm 27 is received between the hinge arms 31, 33, and a hinge pin 35 hingedly connects the hinge arm 27 and the hinge arms 31, 33. The hinge arm 28 is received between the hinge arms 32, 34, and a hinge pin 36 hingedly connects the hinge arm 28 and the hinge arms 32, 34. The hinge pins 35, 36 are disposed on a common axis, which is the hinge axis 17 shown in FIG. 2, and which is centrally disposed between the adjacent hatch cover panels 11, 12. As seen in FIG. 3, the hinge axis 17 is disposed slightly below the bottom plane of the hatch cover panels 11, 12, whereby the hatch cover panels 11, 12 will be spaced a slight distance from each other when disposed in stowed position, as seen in FIG. 8.

The actuating structure comprises an actuating lever 40 disposed between the hinge arms 27, 28. The actuating lever 40 is formed as a bell crank lever having a downwardly extending arm 41 which is pivotally connected to the hinge arms 27, 28 between bosses 42, 43, respectively, by a pivot pin 44 at a point which is below the inner face plane of the closed panels a greater distance than the hinge axis 17. A connecting link 45 has one end thereof pivotally connected to the actuating lever 40 by a pivot pin 46, and the opposite end of the connecting link 45 is pivotally connected to the inner hinge arms 31, 32 by a pivot pin 47. The connecting link 45 provides a force transmitting element between the actuating lever 40 and the hinge element 30, through which force is applied to the hatch cover panel 12. The actuating lever 40 also includes an actuating arm 48 which extends through an opening 49 formed in the hinge plate 29. It will be seen that the distance from the hinge axis 17 to the pin 47 is greater than the distance from the axis 17 to the pin 44, and that the pin 46 is spaced further from the pin 44 than from the pin 47.

Suitable power means, which may be in the form of a hydraulic cylinder and piston device 50, is provided for applying power to the actuating lever 40. The cylinder and piston device 50 has its cylinder end pivotally secured to the hatch cover panel 11 by a pivot pin 51 received in a clevis 52, which is fixedly secured to the hatch cover panel 11, and in a thimble 56 secured to the cylinder end of the cylinder and piston device 50. The piston rod end of the cylinder and piston device 50 is pivotally connected to the actuating arm 48 of the actuating lever 40 by a pivot pin 53 received in a clevis 54, which is secured to the end of the piston rod 55, and in the end of actuating arm 48. The pivot pin 53 is spaced downwardly from the upper face plane of the closed panels more than the pivot pin 46.

The hydraulic cylinder and piston device 50 is preferably double-acting for positive actuation of the hatch cover panels 11, 12 from their first closed position in planar alignment to their second stowed position in substantial parallelism, and for reverse actuation of the latch cover panels 11, 12 from stowed to closed position. The application of hydraulic fluid under pressure to the cylinder end of the cylinder and piston device 50 produces outward linear motion of the piston rod 55, and the force of the hydraulic fluid is transmitted through the piston rod 55 to the actuating lever 40, which, acting about the axis of the pivot pin 44, transmits force through the connecting link 45. The force is transmitted from the actuating lever 40 and the connecting link 45 to the hinge elements 26, 30, respectively, applying torque to the latter and producing rotation thereof about the axis 17 of the hinge pins 35, 36. The outer end of the hatch cover panel 11 is constrained by hinge arms 22, 23 and hinge pins 24, and therefore, relative swinging movement of the hinge elements 26, 30 will cause the hatch cover panels 11, 12 to raise up off the hatch coaming 16 and to move towards their stowed positions at the one end of the hatch opening 15. It will be seen that in the FIG. 3, closed position of the panels the angle between the line of force of the piston and cylinder device 50, acting through pivot pin 53, and a line between pivot pins 53 and 44 is obtuse, and that such angle does not become 90° until the panels have been moved through an angle somewhat less than that illustrated in FIG. 7. In FIG. 7 there is illustrated an intermediate actuated position of the hatch cover panels 11, 12 in which they have each been moved through an arc of approximately 45°. It is seen that the piston rod 55 is partially extended from the cylinder and piston device 50, and that the piston rod 55 moves through the opening 49 in the hinge plate 29 to reach the actuating arm 48 of the actuating lever 40. The pivotal connections at the opposite ends of the cylinder and piston device 50 permit the latter to adjust its position as dictated by the movement of the several links of the combined hinge and actuating mechanism 25. In FIG. 8, the hatch cover panels 11, 12 are seen in stowed position, in which they are disposed in substantial parallelism and spaced a slight distance from each other. The hatch cover panels 11, 12 have been swung through an angle of 180° relative to each other about the hinge axis 17 of the hinge pins 35, 36 and the piston rod 55 is fully extended. For reverse actuation of the hatch cover panels 11, 12 to their closed position, hydraulic fluid under pressure is applied to the piston rod end of the hydraulic cylinder and piston device 50, which produces inward linear motion of the piston rod 55, and produces reverse movement of the combined hinge and actuating mechanism 25, thereby lowering the hatch cover panels 11, 12 onto the coaming 16.

In the usual application of the instant invention, several combined hinge and actuating mechanisms are provided between a pair of hatch cover panels, the exact number thereof being determined by structural and force requirements considerations. In any event, each combined hinge and actuating mechanism provides a compact, unitary assembly of the hinge and actuating elements, which is efficiently operating to apply the required torques on the hinge elements for actuation of the hatch cover panels. In operation of the hatch cover panels, during the initial stages of raising the hatch cover panels from the coaming, the torque requirements are maximum and became less as the operation of opening the hatch cover panels progresses. The combined hinge and actuating mechanism of this invention provides available torque acting on the hinge elements which satisfies the varying torque requirements that are encountered as the operation of the hatch cover panels progresses. Further, within the scope of the invention as disclosed herein, the proportions of the combined hinge and actuating mechanism may be varied to vary the available torque provided thereby. In a hatch cover as illustrated herein, wherein four hatch cover panels are operated together as a set, the combined hinge and actuating mechanism of the instant invention will be provided between two pairs of panels. By suitable construction of the control system, or by selection of the hydraulic cylinder and piston devices, sequential operation of the hatch cover panels may be provided, for example, to build in a time lag in the operation of the two innermost hatch cover panels.

Obviously, those skilled in the art may make various changes in the details and arrangements of parts without departing from the spirit and scope of the invention as defined by the claims hereto attended, and, applicant therefore wishes not to be restricted to the precise construction herein disclosed, which is merely a preferred embodiment of the invention defined by the claims.

Having thus described and shown an embodiment of the invention, what it is desired to secure by Letters Patent of the United States is:

1. A hatch cover actuating mechanism for actuating a pair of hatch cover panels between a closed position in which they are in planar alignment and a stowed position in which they are substantially parallel to each other, comprising a first hinge element secured to one of said panels, a second hinge element secured to the other of said panels, hinge pin means interconnecting portions of said first and second hinge elements which extend below the bottom plane of said panels when said panels are in a closed position, actuating lever means pivotally connected at one end to said first hinge element, power operated drive means associated with said one panel and pivotally connected to said actuating lever means for rotating the latter about the pivotal connection thereof with said first hinge element, the line of force of said power operated drive means when the panels are in a closed position forming an obtuse angle with a line between the pivotal connection between said drive means and said actuating lever means and the pivotal connection between said actuating lever means and said first hinge element, connecting link means pivotally connected respectively at its ends to said second hinge element and to said actuating lever means, the pivotal connection between said actuating lever means, the said connecting link means when the panels are in a closed position being spaced upwardly relative both to the pivotal connection between said drive means and said actuating lever means and the pivotal connection between the connecting link means and said second hinge element.

2. The combination of claim 1 wherein the pivotal connection between said actuating lever and said first hinge element is spaced downwardly from said hinge pin means when the panels are in a closed position.

3. The combination of claim 2 wherein the spacing of the pivotal connection between said link means and said second hinge element from said hinge pin means is greater than that from the latter to the pivotal connection between said actuating lever means and said first hinge element.

4. The combination of claim 3 wherein the spacing between the pivotal connections between said actuating lever and said first hinge element, and said actuating lever and said link means is greater than that from the latter pivotal connection to the pivotal connection between said link means and said second hinge element.

References Cited by the Examiner
UNITED STATES PATENTS 2,906,324   9/1959   Hannigan _____ 160—188

FOREIGN PATENTS 564,136   2/1958   Belgium.

HARRISON R. MOSELEY, *Primary Examiner.*